United States Patent
Mou et al.

(10) Patent No.: US 10,871,155 B2
(45) Date of Patent: Dec. 22, 2020

(54) GAS TRANSPORTATION DEVICE

(71) Applicant: Microjet Technology Co., Ltd., Hsinchu (TW)

(72) Inventors: Hao-Jan Mou, Hsinchu (TW); Chi-Feng Huang, Hsinchu (TW); Wei-Ming Lee, Hsinchu (TW); Yung-Lung Han, Hsinchu (TW); Chang-Yen Tsai, Hsinchu (TW)

(73) Assignee: MICROJET TECHNOLOGY CO., LTD., Hsinchu (TW)

( * ) Notice: Subject to any disclaimer, the term of this patent is extended or adjusted under 35 U.S.C. 154(b) by 214 days.

(21) Appl. No.: 16/104,327

(22) Filed: Aug. 17, 2018

(65) Prior Publication Data
US 2019/0085836 A1 Mar. 21, 2019

(30) Foreign Application Priority Data

Sep. 15, 2017 (TW) .............................. 106131786 A

(51) Int. Cl.
*F04B 39/10* (2006.01)
*F04B 43/04* (2006.01)
(Continued)

(52) U.S. Cl.
CPC ........ *F04B 39/1066* (2013.01); *F04B 43/046* (2013.01); *F04B 45/047* (2013.01); *F16K 99/0048* (2013.01); *F16K 2099/0094* (2013.01)

(58) Field of Classification Search
CPC .... F04B 11/005; F04B 27/12; F04B 37/1002; F04B 43/046; F04B 43/043; F04B 45/047;
(Continued)

(56) References Cited

U.S. PATENT DOCUMENTS

| 5,542,821 A | 8/1996 | Dugan | |
|---|---|---|---|
| 7,258,533 B2 * | 8/2007 | Tanner | F04B 43/046 137/855 |

(Continued)

FOREIGN PATENT DOCUMENTS

| CN | 1247593 A | 3/2000 |
|---|---|---|
| CN | 1399070 A | 2/2003 |

(Continued)

OTHER PUBLICATIONS

Extended European Search Report, dated Oct. 24, 2018, for European Application No. 18189363.7.

*Primary Examiner* — Patrick Hamo
*Assistant Examiner* — Joseph S. Herrmann
(74) *Attorney, Agent, or Firm* — Birch, Stewart, Kolasch & Birch, LLP

(57) ABSTRACT

A gas transportation device is provided and includes a first flow guiding unit and a second flow guiding unit, each of which includes an inlet and an outlet. While the first flow guiding unit and the second flow guiding unit are actuated, gas is inhaled through the respective inlets and discharged out through the respective outlets. A gas-collection chamber is disposed between the first flow guiding unit and the second flow guiding unit and includes a discharging opening. The gas is inhaled through the inlets of the first flow guiding unit and the second flow guiding unit, and transported to the gas-collection chamber through the outlets thereof. The gas in the gas-collection chamber is discharged out through the outlets of the first flow guiding unit and the second flow guiding unit, to achieve an adjustment of gas transportation amount.

11 Claims, 9 Drawing Sheets

(51) Int. Cl.
*F04B 45/047* (2006.01)
*F16K 99/00* (2006.01)

(58) Field of Classification Search
CPC ............. F04B 39/1066; F16K 99/0048; F16K 2099/0094
USPC ...... 417/338, 413.2, 515; 310/311, 345, 348
See application file for complete search history.

(56) References Cited

U.S. PATENT DOCUMENTS

| | | | | |
|---|---|---|---|---|
| 8,646,479 | B2* | 2/2014 | Jaeb | F04B 43/046 |
| | | | | 137/512.15 |
| 8,747,080 | B2* | 6/2014 | Kodama | F04B 43/043 |
| 9,022,746 | B2* | 5/2015 | Kroupa | F04B 43/026 |
| | | | | 417/53 |
| 9,433,359 | B2* | 9/2016 | Sano | F04B 43/046 |
| 10,480,502 | B2* | 11/2019 | Hirata | F04B 43/046 |
| 2006/0147329 | A1* | 7/2006 | Tanner | F04B 43/046 |
| | | | | 417/505 |
| 2012/0171062 | A1 | 7/2012 | Kodama et al. | |

FOREIGN PATENT DOCUMENTS

| | | | |
|---|---|---|---|
| CN | 1403282 | A | 3/2003 |
| CN | 102459899 | A | 5/2012 |
| CN | 104302913 | A | 1/2015 |
| CN | 104632588 | A | 5/2015 |
| CN | 205503415 | U | 8/2016 |
| JP | 2008-180104 | A | 8/2008 |
| JP | 2011-241808 | A | 12/2011 |

\* cited by examiner

GAS TRANSPORTATION DEVICE

FIELD OF THE INVENTION

The present disclosure relates to a gas transportation device, and more particularly to a miniature, thin and silent gas transportation device.

BACKGROUND OF THE INVENTION

Currently, in all fields, the products used in many sectors such as pharmaceutical industries, computer techniques, printing industries or energy industries are developed toward elaboration and miniaturization. The gas transportation devices are important components that are used in for example micro pumps, micro atomizers, printheads or the industrial printers. Therefore, how to utilize an innovative structure to break through the bottleneck of the prior art has become an important part of development.

With the rapid advancement of science and technology, the application of gas transportation device tends to be more and more diversified. No matter the industrial applications, the biomedical applications, the healthcare, the electronic cooling, or the wearable devices which are popular these years, the gas transportation devices are utilized therein, and it can be observed that the conventional gas transportation devices gradually tend to have miniaturized structure and maximized flow rate.

The conventional gas transportation devices are mainly constructed by stacking the mechanism components, each of which has minimized size or thinned thickness for miniaturizing the whole devices. However, it is difficult to control the dimensional accuracy and the assembly accuracy of those miniaturized conventional mechanism components. As a result, the product yield rate fluctuates and the transported gas flow is unstable.

Furthermore, the conventional gas transportation devices also have the problem of insufficient transportation amount. It is difficult to meet the requirement of transporting a large amount of gas by a single gas transportation device. Moreover, the conventional gas transportation devices usually have leading pins protruding outwardly for power connection, which enhances difficulty of assembling a plurality of conventional gas transportation devices side by side for the purpose of increasing gas transportation amount, since it is hard to control the assembling accuracy. Also, the leading pins are likely to cause obstacles during assembling, and the supply lines externally connected thereto are set complicated. Therefore, it is difficult to assemble plural conventional gas transportation devices in such way to increase the gas transportation amount, and the arrange way of the conventional gas transportation devices are not flexible.

Therefore, there is a need of providing a gas transportation device having flexibility in applying to various apparatus and equipments, as well as solving the above-mentioned problems that the apparatuses or the equipments utilizing the conventional gas transportation devices are hard to be miniaturized and silent, the dimensional accuracy thereof is hard to control, and the gas transportation amount thereof is insufficient.

SUMMARY OF THE INVENTION

The object of the present disclosure is to provide a gas transportation device. The miniaturized gas transportation device is integrally produced into one piece by a micro-electromechanical process. Thus, it overcomes the problem that the conventional gas transportation devices cannot have a small size and be miniaturized. It also avoids the difficulty of controlling the dimensional accuracy and improves the problem of insufficient flow rate.

In accordance with an aspect of the present disclosure, there is provided a gas transportation device including a first flow guiding unit and a second flow guiding unit, each of which includes an inlet and an outlet. While the first flow guiding unit and the second flow guiding unit are actuated, gas is inhaled through the respective inlets and discharged out through the respective outlets. A gas-collection chamber is disposed between the first flow guiding unit and the second flow guiding unit and has a discharging opening. The gas is inhaled through the inlets of the first flow guiding unit and the second flow guiding unit, and transported to the gas-collection chamber through the outlets thereof. The gas in the gas-collection chamber is discharged out through the discharging opening to achieve an adjustment of gas transportation amount.

The above contents of the present disclosure will become more readily apparent to those ordinarily skilled in the art after reviewing the following detailed description and accompanying drawings, in which:

DETAILED DESCRIPTION OF THE PREFERRED EMBODIMENT

Figure 1:
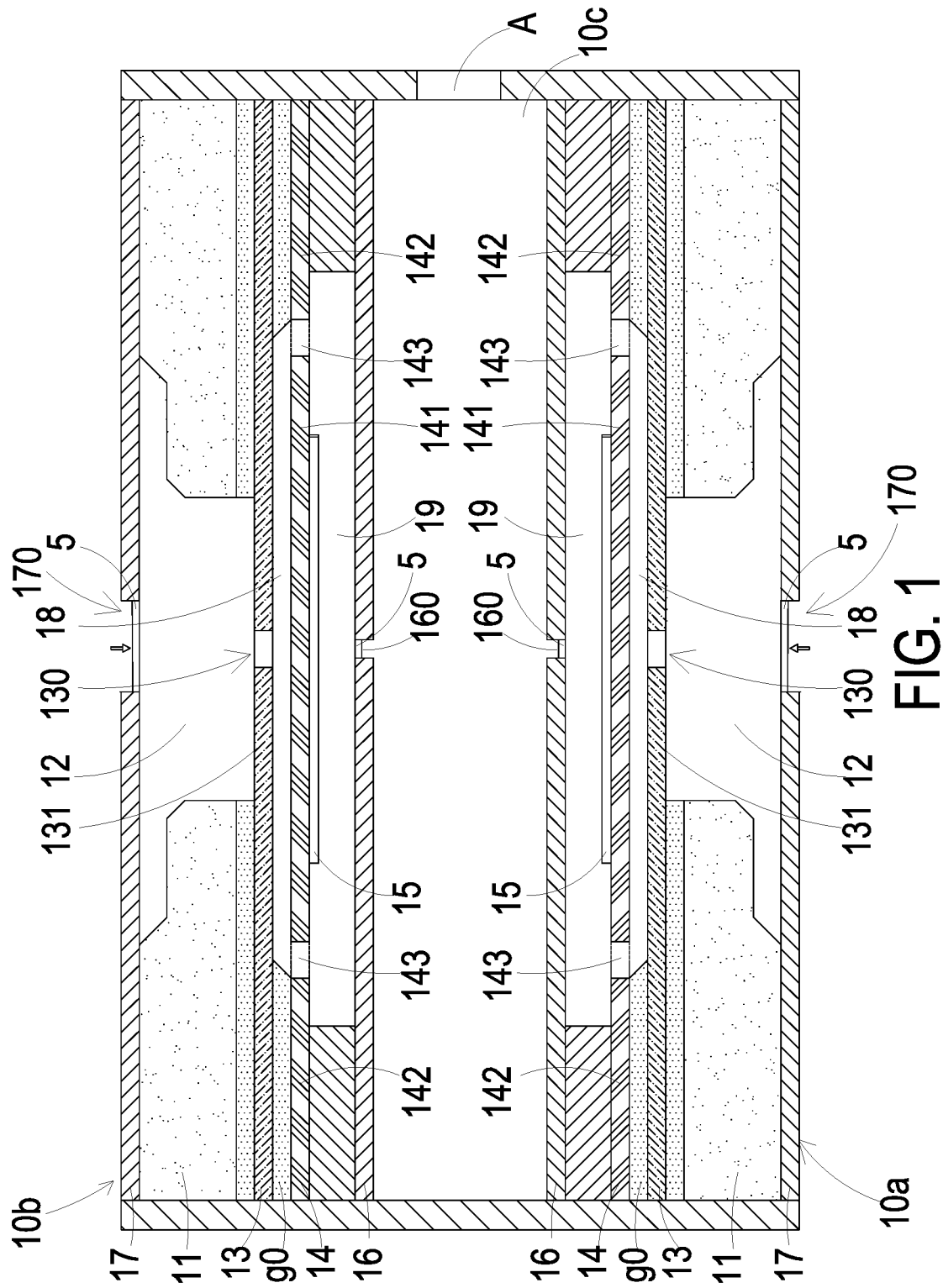
FIG. 1 is a cross-sectional view illustrating a gas transportation device according to a embodiment of the present disclosure.

The present disclosure will now be described more specifically with reference to the following embodiments. It is to be noted that the following descriptions of preferred embodiments of this disclosure are presented herein for purpose of illustration and description only. It is not intended to be exhaustive or to be limited to the precise form disclosed.

Please refer to FIGS. 1A to 3C. The present discourse provides a gas transportation device 1 including at least one first flow guiding unit 10a, at least one second flow guiding unit 10b, at least one inlet 170, at least one outlet 160, at least one gas-collection chamber 10c and at least one discharging opening A. The number of the first flow guiding unit 10a, the second flow guiding unit 10b, the inlet 170, the outlet 160, the gas-collection chamber 10c and the discharging opening A is exemplified by one for each in the following embodiments but not limited thereto. It is noted that each of the first flow guiding unit 10a, the second flow guiding unit 10b, the inlet 170, the outlet 160, the gas-collection chamber 10c and the discharging opening A can also be provided in plural numbers.

The present disclosure provides a gas transportation device 1 produced into one piece by a micro-electro-mechanical-system (MEMS) process and overcomes the problems that the conventional gas transportation devices cannot have a small size, be miniaturized and discharge fluid at an insufficient flow rate. Also, the gas transportation device 1 avoids the difficulty of controlling dimensional accuracy and precisely manufacturing the gas transportation device of miniature dimensions. In one embodiment shown in FIGS. 1 and 2, the gas transportation device 1 includes a first flow guiding unit 10a, a second flow guiding unit 10b and a gas-collection chamber 10c. The gas-collection chamber 10c is formed between the first flow guiding unit 10a and the second flow guiding unit 10b and has a discharging opening A. In this embodiment, the first flow guiding unit 10a and the second flow guiding unit 10b have the same structures, each of which includes an inlet plate 17, a substrate 11, a resonance plate 13, an actuating plate 14, a piezoelectric component 15 and an outlet plate 16 sequentially stacked. The inlet plate 17 has at least one inlet 170. The resonance plate 13 has a central aperture 130 and a movable part 131. A convergence chamber 12 is formed between the resonance plate 13 and the inlet plate 17. The actuating plate 14 includes a suspension part 141, an outer frame part 142 and a plurality of vacant spaces 143. The outlet plate 16 has at least one outlet 160.

Since the first flow guiding unit 10a and the second flow guiding unit 10b have the same structures in the present embodiment, the structures thereof are exemplified only by the first flow guiding unit 10a hereinafter. The first flow guiding unit 10a is formed by the inlet 170 of the inlet plate 17, the convergence chamber 12 of the substrate 11, the central aperture 130 and the movable part 131 of the resonance plate 13, the suspension part 141 and the plurality of vacant spaces 143 of the actuating plate 14, the piezoelectric component 15 and the outlet plate 16. In other words, the first flow guiding unit 10a includes a convergence chamber 12, a central aperture 130, a movable part 131, a suspension part 141, a plurality of vacant spaces 143, a piezoelectric component 15 and an outlet plate 16. The resonance plate 13 and the actuating plate 14 have a gap g0 therebetween to form a first chamber 18 (as shown in FIG. 2), and a second chamber 19 is formed between the actuating plate 14 and the outlet plate 16 (as shown in FIG. 2).

Figure 2:
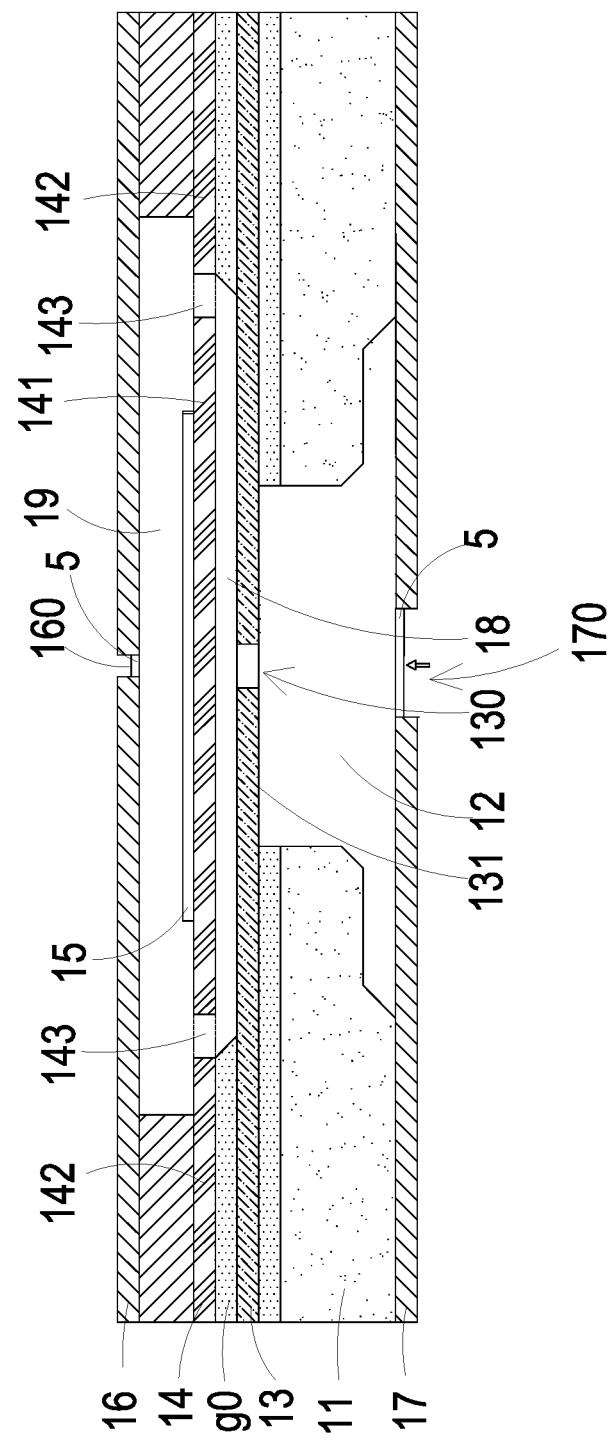
FIG. 2 is an enlarged cross-sectional view illustrating a first flow guiding unit of the gas transportation device of FIG. 1.

Please refer to FIG. 2. The inlet plate 17 has at least one inlet 170, each of which is a through hole running through the inlet plate 17 and allows gas to flow therethrough. The number of the inlet 170 is one in this embodiment but may be more than one in some other embodiments, as the number and the arrangement thereof can be varied according to the practical requirements. In some embodiments, the inlet plate 17 may further include a filter device (not shown) disposed within the inlet 170 to filter the dust or impurities in the gas flowing therethrough. Consequently, the impurities and the dust are prevented from flowing into the gas transportation device 1 to damage the inner components thereof.

In some embodiments, the substrate 11 of the first flow guiding unit 10a may further include a driving circuit (not shown) electrically connected to the positive electrode and the negative electrode of the piezoelectric component 15 for providing driving power. The driving circuit can be disposed at any position within the gas transportation device 1.

Please refer to FIGS. 1 and 2. In the present embodiment, the resonance plate 13 of the first flow guiding unit 10a has a suspension structure. The resonance plate 13 includes a central aperture 130 and a movable part 131. The central aperture 130 may be located at the center of the movable part 131, while it is running through the resonance plate 13 and is in communication between the convergence chamber 12 and the first chamber 18 for allowing gas to flow therebetween. The movable part 131 may be a portion of the resonance plate 13 and has a flexible structure undergoing the upward and downward bending vibration while being driven by the actuating plate 14 to transport the gas.

Please refer to FIGS. 1 and 2 again. In the present embodiment, the actuating plate 14 of the first flow guiding unit 10a may be a metallic membrane or a polysilicon membrane, but not limited thereto. The actuating plate 14 includes a hollow and suspension structure. The actuating plate 14 further includes a suspension part 141 and an outer frame part 142. As mentioned above, the first flow guiding unit 10a and the second flow guiding unit 10b have the same structures in the present embodiment, so each of the first flow guiding unit 10a and the second flow guiding unit 10b includes one suspension part 141, but only the suspension part 141 of the first flow guiding unit 10a is exemplified as below. The suspension part 141 is connected to the outer frame part 142 by a plurality of connection parts (not shown), so that the suspension part 141 is suspended and elastically supported by the outer frame part 142. There are a plurality of vacant spaces 143 defined between the suspension part 141 and the outer frame part 142 for allowing gas to flow therethrough. The arrangement, the types and the numbers of the suspension part 141, the out frame 142 and the vacant spaces 143 are varied according to the practical requirements, but not limited thereto. In some embodiments, the suspension part 141 has a stepped structure. Namely, the suspension part 141 further includes a bulge (not shown). The bulge can be for example but not limited to a circular convex structure, and formed on a surface of the suspension part 141 facing the resonance plate 13. The depth of the first chamber 18 is maintained within a specific range, not being too small to avoid noise resulted from the collision between the movable part 131 and the actuating plate 14 while the movable part 131 is vibrating, and not being too big to avoid insufficient gas pressure for transporting the gas. The arrangement of the bulge facilitates maintaining and adjusting the proper depth of the first chamber 18.

Please refer to FIGS. 1 and 2. As mentioned above, the first flow guiding unit 10a and the second flow guiding unit 10b have the same structures in the present embodiment, so each of the first flow guiding unit 10a and the second flow guiding unit 10b of the gas transportation device 1 includes one piezoelectric component 15, but only the piezoelectric component 15 of the first flow guiding unit 10a is exemplified as below. The piezoelectric component 15 is attached on a surface of the suspension part 141 facing the outlet plate 16. The piezoelectric component 15 further includes a positive electrode and a negative electrode (not shown) for electrical connection. In response to a receiving voltage, the piezoelectric component 15 undergoes deformation, driving the actuating plate 14 to vibrate along a vertical direction in a reciprocating manner. Meanwhile, the resonance plate 13 is also driven to vibrate in resonance with the actuating plate 14. In this way, a pressure change occurs in the first chamber 18 for transporting the gas.

Referring to FIGS. 1 and 2, according to the present embodiment, the outlet plate 16 of the first flow guiding unit 10a includes an outlet 160. As mentioned above, the first flow guiding unit 10a and the second flow guiding unit 10b have the same structures in the present embodiment, so each of the first flow guiding unit 10a and the second flow guiding unit 10b includes one outlet 160, but only the outlet 160 of the first flow guiding unit 10a is exemplified as below. The outlet 160 is in fluid communication between the second chamber 19 and the exterior of the outlet plate 16, so that the gas can flow from the second chamber 19 to the exterior of the outlet plate 16 through the outlet 160 to achieve gas transportation.

Figure 3A:
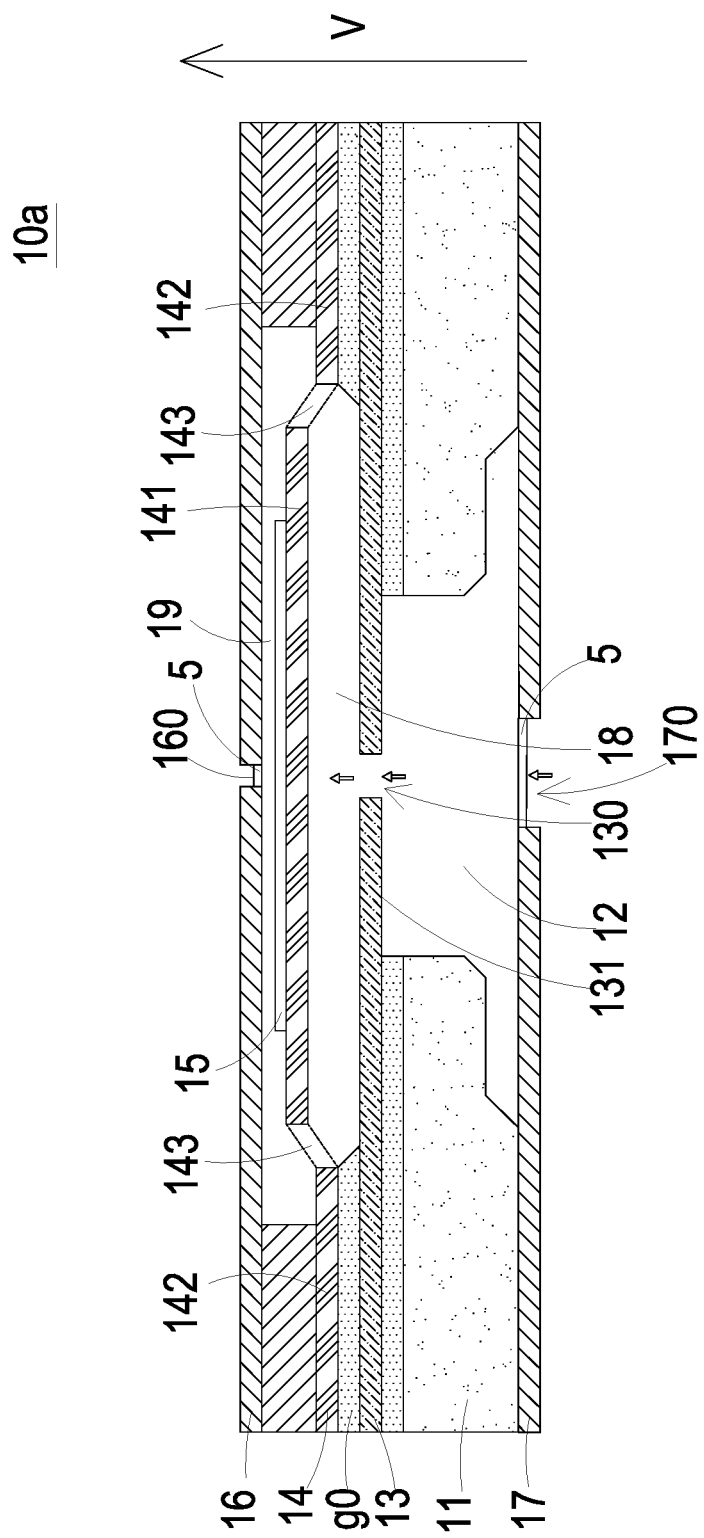
FIGS. 3A to 3C are cross-sectional views illustrating processing actions of the first flow guiding unit of the gas transportation device of FIG. 2.
Figure 3B:
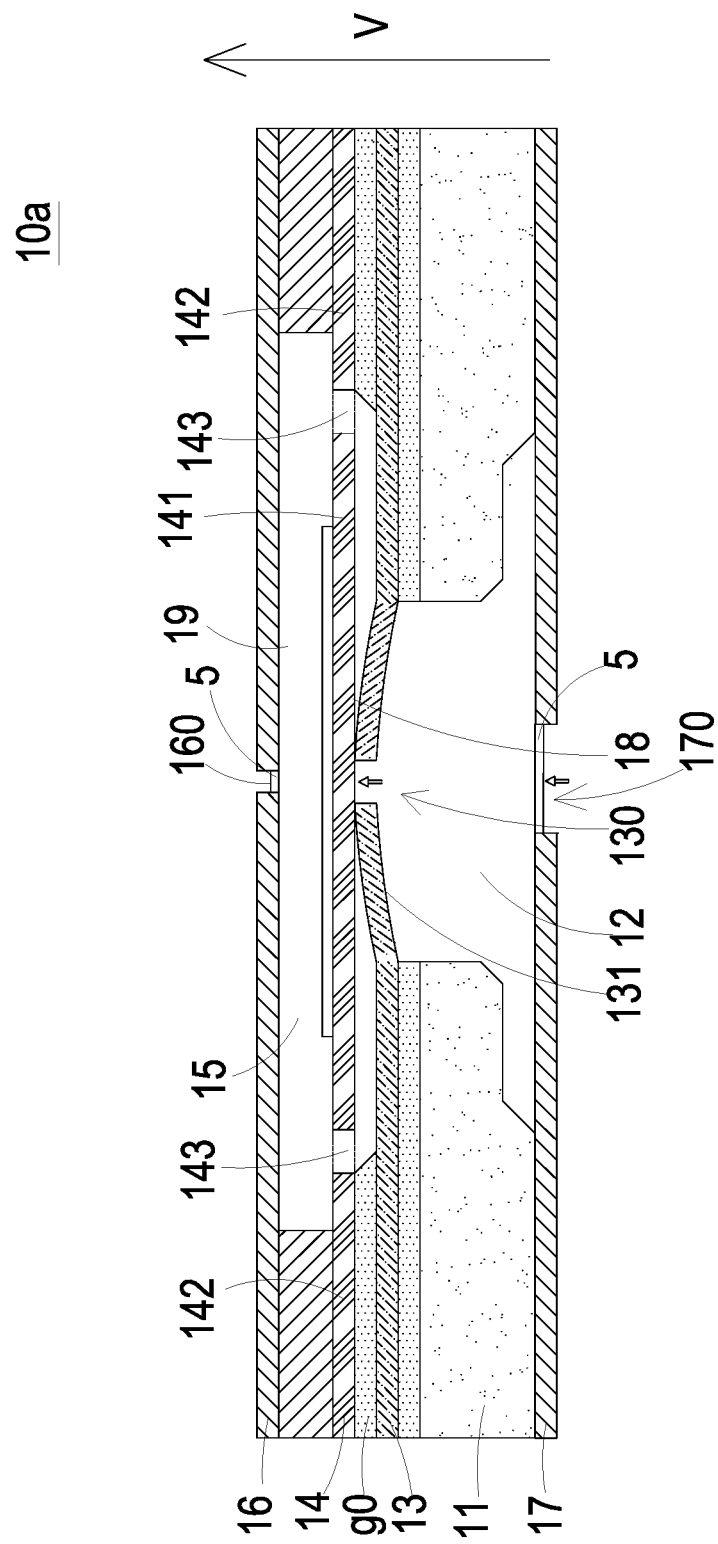
Figure 3C:
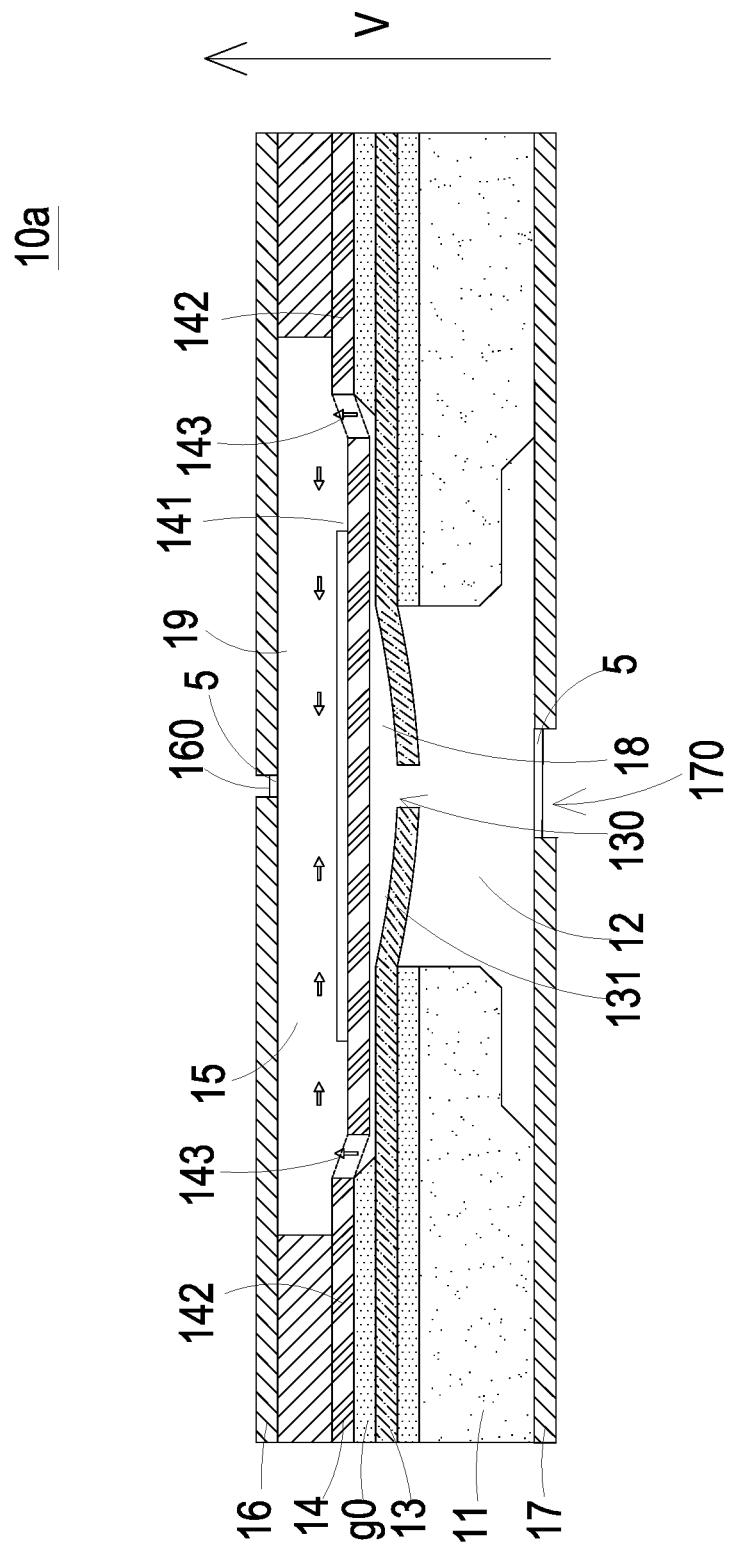

Please refer to FIGS. 2 to 3C. FIG. 3A to 3C are cross-sectional views illustrating processing actions of the first flow guiding unit of the gas transportation device of FIG. 2. Firstly, the first flow guiding unit 10a of the gas transportation device 1 shown in FIG. 2 is in a non-enabled state (i.e., an initial state). There is a gap g0 formed between the resonance plate 13 and the actuating plate 14 to maintain a proper distance between the resonance plate 13 and the suspension part 141 of the actuating plate 14. Thus, the gas can be transported more rapidly, and the contact interference between the suspension part 141 and the resonance plate 13 which causes noise is reduced.

Referring to the first flow guiding unit 10a shown in FIGS. 2 and 3A, when the piezoelectric component 15 actuates the actuating plate 14 in response to an applied voltage, the suspension part 141 of the actuating plate 14 vibrates in the V direction. Meanwhile, the volume of the first chamber 18 increases and the pressure of the first chamber 18 decreases. Thus, the gas is inhaled via the inlet 170 of the inlet plate 17 as being pushed by external air pressure. The gas is collected into the convergence chamber 12 of the substrate 11. Afterwards, the gas flows in the V direction into the first chamber 18 via the central aperture 130 of the resonance plate 13 while the central aperture 130 is spatially corresponding to the convergence chamber 12. Then, as shown in FIGS. 2 and 3B, the movable part 131 of the resonance plate 13 is driven to vibrate in the V direction due to resonance of the vibration of the suspension part 141, as the suspension part 141 of the actuating plate 14 is vibrating in an opposite direction at the same time. Consequently, the movable part 131 of the resonance plate 13 is attached to the suspension part 141 of the actuating plate 14 and the flowing space in the center of the first chamber 18 is closed. At this moment, the first chamber 18 is compressed to be decreased in volume and increased in pressure, while the second chamber 19 is increased in volume and decreased in pressure. Under this circumstance, the pressure gradient occurs, making the gas within the first chamber 18 move toward peripheral area of the first chamber 18, and flow into the second chamber 19 through the plurality of vacant spaces 143 of the actuating plate 14.

Furthermore, as shown in FIGS. 2 and 3C, the suspension part 141 of the actuating plate 14 continues vibrating in the direction opposite to the direction V, and drives the movable part 131 of the resonance plate 13 to vibrate in the same direction along therewith. Thus, the first chamber 18 is further compressed, and most of the gas therein is transported into the second chamber 19 to be temporarily stored.

Finally, the suspension part 141 of the actuating plate 14 vibrates in the direction V again, so that the second chamber 19 is compressed. At this moment, the volume of the second chamber 19 decreases and the pressure of the second chamber 19 increases. Thus, the gas stored in the second chamber 19 is discharged out of the outlet plate 16 through the outlet 160, by which the gas transportation is accomplished. Then, repeating the action illustrating in FIG. 3A, the volume of the first chamber 18 is increased and the pressure thereof is reduced, thus making the ambient gas inhaled via the inlet 170 of the inlet plate 17, collected into the convergence chamber 12 of the substrate 11 and transported in the direction V into the first chamber 18 via the central aperture 130 of the resonance plate 13. The above described processing actions of the flow guiding unit 10 in FIGS. 3A to 3C are repeatedly done. As the suspension part 141 of the actuating plate 14 and the movable part 131 of the resonance plate 13 continue vibrating upwardly and downwardly in a reciprocating manner, the gas can be continuously introduced into the inlet 170 and transported toward the outlet 160, so as to accomplish the gas transportation.

From the above description, in the present embodiment, a pressure gradient is generated in the designed flow channels of each of the first flow guiding unit 10a and the second flow guiding unit 10b of the gas transportation device 1 to make the gas flow at a high speed. Moreover, since there is an impedance difference between the feeding direction and the exiting direction, the gas is transported from the inlet side to the outlet side. Even if the outlet side is under a certain pressure, the first flow guiding unit 10a is still capable of pushing the gas out to the outlet side while achieving the silent efficacy. In some embodiments, the vibration frequency of the resonance plate 13 may be the same as the vibration frequency of the actuating plate 14. Namely, both of the resonance plate 13 and the actuating plate 14 may move in the same direction simultaneously. The processing actions can be adjustable according to the practical requirements, but not limited to that of the embodiments.

Please refer to FIG. 1 again. In the present embodiment, the second flow guiding unit 10b is vertically stacked on the first flow guiding unit 10a as the outlet plate 16 of the second flow guiding unit 10b and the outlet plate 16 of the first flow guiding unit 10a are facing each other. The gas-collection chamber 10c between the first flow guiding unit 10a and the second flow guiding unit 10b is in communication with the outlets 160 of the first flow guiding unit 10a and the second flow guiding unit 10b. While the first flow guiding unit 10a and the second flow guiding unit 10b are actuated, the gas is inhaled through the inlets 170 of the first flow guiding unit 10a and the second flow guiding unit 10b, then being transported to the gas-collection chamber 10c through the outlets 160 of the first flow guiding unit 10a and the second flow guiding unit 10b to be accumulated. The gas from the first flow guiding unit 10a and the second flow guiding unit 10b is collected in the gas-collection chamber 10c and then discharged out through the discharging opening A. The gas transportation device 1 uses actuation of the first flow guiding unit 10a and the second flow guiding unit 10b to adjust the gas transportation amount thereof.

The first flow guiding unit 10a and the second flow guiding unit 10b of the gas transportation device 1 have high flexibility in assembling arrangement as long as being connected with the driving circuit, which make them suitably applied to various electronic components. Each of the first flow guiding unit 10a and the second flow guiding unit 10b can be individually controlled to be enabled or disabled. For example, the first flow guiding unit 10a and the second flow guiding unit 10b can be enabled simultaneously to transport the gas together for the meeting the requirement of a large flow rate. Alternatively, the first flow guiding unit 10a is enabled and the second flow guiding unit 10b is disabled, or the first flow guiding unit 10a and the second flow guiding unit 10b can be controlled to operate alternately. Thus, the gas transportation device 1 of the present disclosure provides an adjustable gas transportation amount (e.g., volume flow rate) to meet various requirements and achieve a significant reduction in power consumption.

Please refer to FIG. 1 again. The gas transportation device 1 further includes at least one valve 5 which may be disposed within any one of the at least one inlet 170 and the at least one outlet 160 of the first flow guiding unit 10a, and the at least one inlet 170 and the at least one outlet 160 of the second flow guiding unit 10b. In some embodiments, the gas transportation device 1 have a plurality of valves 5 disposed within the inlet 170 and the outlet 160 of each of the first flow guiding unit 10a and the second flow guiding unit 10b.

Figure 4A:
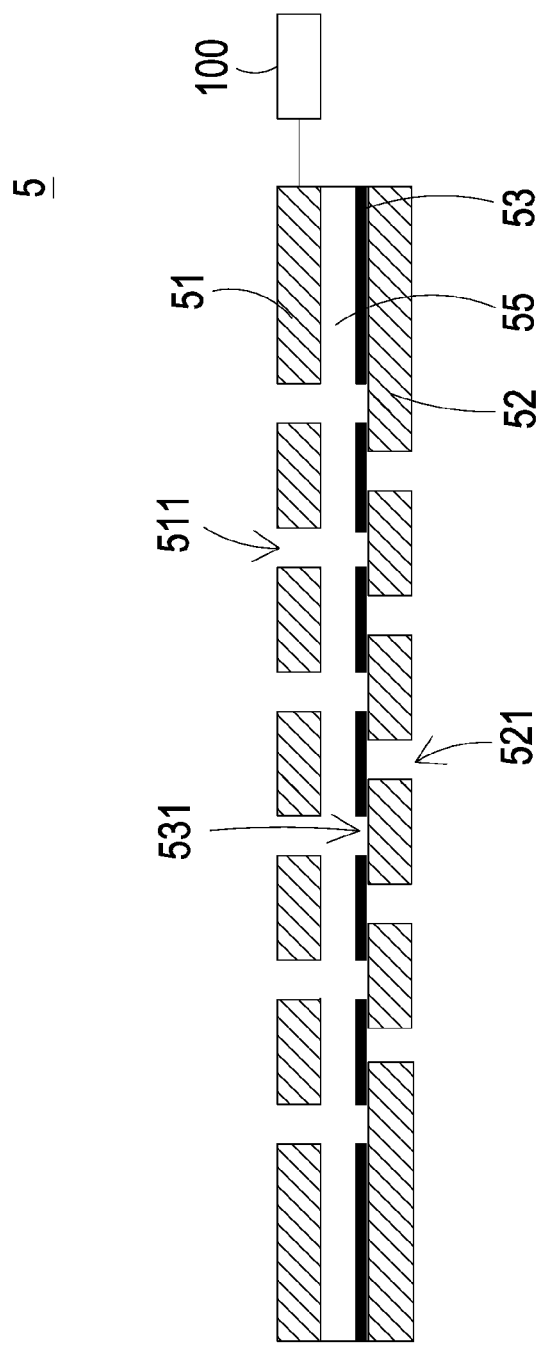
FIGS. 4A and 4B are cross-section views illustrating the actions of a valve according to the first, second and third aspects of the present disclosure.
Figure 4B:
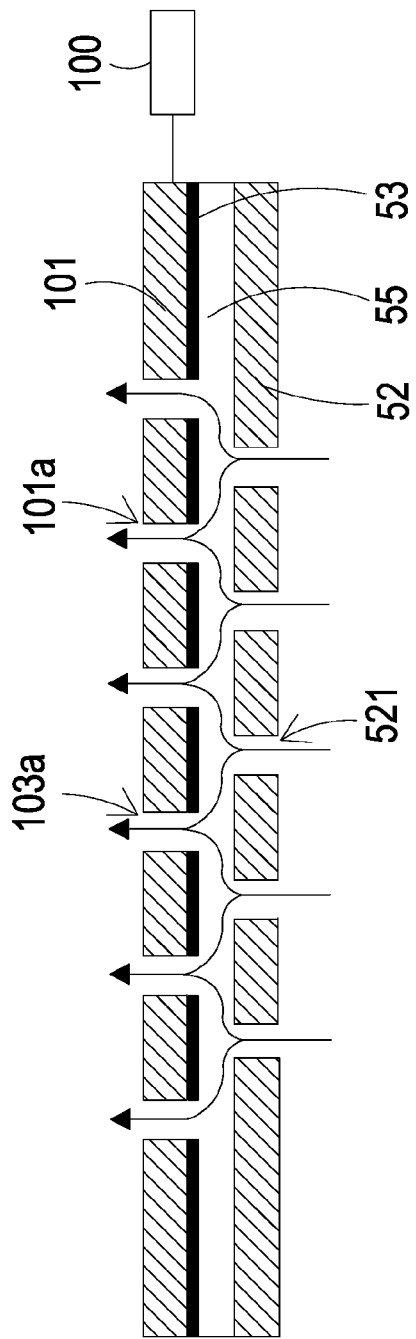

Please refer to FIGS. 4A and 4B. In accordance with a first aspect of the present embodiment, the valve 5 includes a holding component 51, a sealing component 52 and a valve plate 53. The valve plate 53 is disposed within an accommodation space 55 between the holding component 51 and the sealing component 52. The holding component 51 has at least two orifices 511. The valve plate 53 has at least two orifices 531 spatially corresponding to the at least two orifices 511 of the holding component 51, respectively. More specifically, the at least two orifices 511 of the holding component 51 and the at least two orifices 531 of the valve plate 53 are substantially aligned with each other, respectively. The sealing component 52 includes at least one orifice 521. The at least one orifice 521 of the sealing component 52 and the at least two orifices 511 of the holding component 51 are staggered in position to be misaligned with each others.

Please refer to FIGS. 1, 4A and 4B. As shown in FIG. 1, there are four valves 5 in the present embodiment, and the one disposed within the inlet 170 of the inlet plate 17 of the first flow guiding unit 10a is exemplified as below for illustrating the actions of the valve 5 in accordance with the first aspect of the present embodiment. While the gas transportation device 1 is enabled, the gas is inhaled into the gas transportation device 1 through the inlet 170 of the inlet plate 17. At this moment, a suction force is generated inside the gas transportation device 1 and the gas is transported from the exterior to the interior of the gas transportation device 1 along the direction of the arrow shown in FIG. 4B. Consequently, the valve plate 53 is pushed by the gas flow to move from a position close to the sealing component 52 to a position in close contact with the holding component 51, and the orifices 521 of the sealing component 52 are thus opened. Since the orifices 531 of the valve plate 53 are substantially aligned with the orifices 511 of the holding component 51, respectively, the orifices 531 and the orifices 511 are in communication with each other so that the gas is allowed to be inhaled through the orifices 521 of the sealing component 52 into the gas transportation device 1. While the actuating plate 14 of the first flow guiding unit 10a is vibrating in the direction opposite to the direction V (see FIG. 3C), the volume of the first chamber 18 is compressed so that the gas is transported from the first chamber 18 into the second chamber 19 through the plurality of vacant spaces 143. The valve plate 53 of the valve 5 is pushed by the gas flow to move from the position in close contact with the holding component 51 to the position close to the sealing component 52. Therefore, the orifices 521 of the sealing component 52 returns to the closed state shown in FIG. 4A. It can be seen from the above description that the valve 5 ensures the gas to flow unidirectionally in each of the first flow guiding unit 10a and the second flow guiding unit 10b, and the gas is accumulated in the convergence chamber 12. In this way, while the actuating plates 14 of the first flow guiding unit 10a and the second flow guiding unit 10b vibrate in the V direction, the gas is discharged out through the outlets 160 at an increased flow rate, so that the gas transportation amount is raised.

In some embodiments, the holding component 51, the sealing component 52 and the valve plate 53 of the valve 5 are all made of a graphene material for being produced as a miniature valve. In accordance with the second aspect of the valve 5 of the present embodiment, the valve plate 53 is made of a charged material, and the holding component 51 is made of a bipolar conductive material. The holding component 51 is electrically connected to a control circuit 100. The control circuit 100 controls the electrical polarity (positive or negative polarity) of the holding component 51. In case that the valve plate 53 is made of a negative charged material, to open the valve 5, the holding component 51 is controlled to have positive polarity. Since the valve 53 and the holding component 51 are maintained in reversed polarity, the valve plate 53 is moved close to the holding component 51 such that the valve 5 is opened (as shown in FIG. 4B). Alternatively, to close the valve 5 in case that the valve plate 53 is made of a negative charged material, the holding component 51 is controlled to have negative polarity. Since the valve 53 and the holding component 51 are maintained in identical polarity, the valve plate 53 is moved close to the sealing component 52 such that the valve 5 is closed (as shown in FIG. 4A).

In accordance with the third aspect of the valve 5 of the present embodiment, the valve plate 53 is made of a magnetic material. The holding component 51 is made of the magnetic material and can be controlled to have switchable magnetic polarity. The holding component 51 is electrically connected to a control circuit 100. The control circuit 100 controls the magnetic polarity (positive polarity or negative polarity) of the holding component 51. In case that the valve plate 53 is made of the magnetic material and has negative polarity, to open the valve 5, the holding component 51 is controlled to have positive polarity. Since the valve 53 and the holding component 51 are maintained in reversed polarity, the valve plate 53 is moved close to the holding component 51 such that the valve 5 is opened (as shown in FIG. 4B). Alternatively, to close the valve 5 in case that the valve plate 53 is made of the magnetic material and has negative polarity, the holding component 51 is controlled to have negative polarity. Since the valve 53 and the holding component 51 are maintained in identical polarity, the valve plate 53 is moved close to the sealing component 52 such that the valve 5 is closed (as shown in FIG. 4A).

Figure 5A:
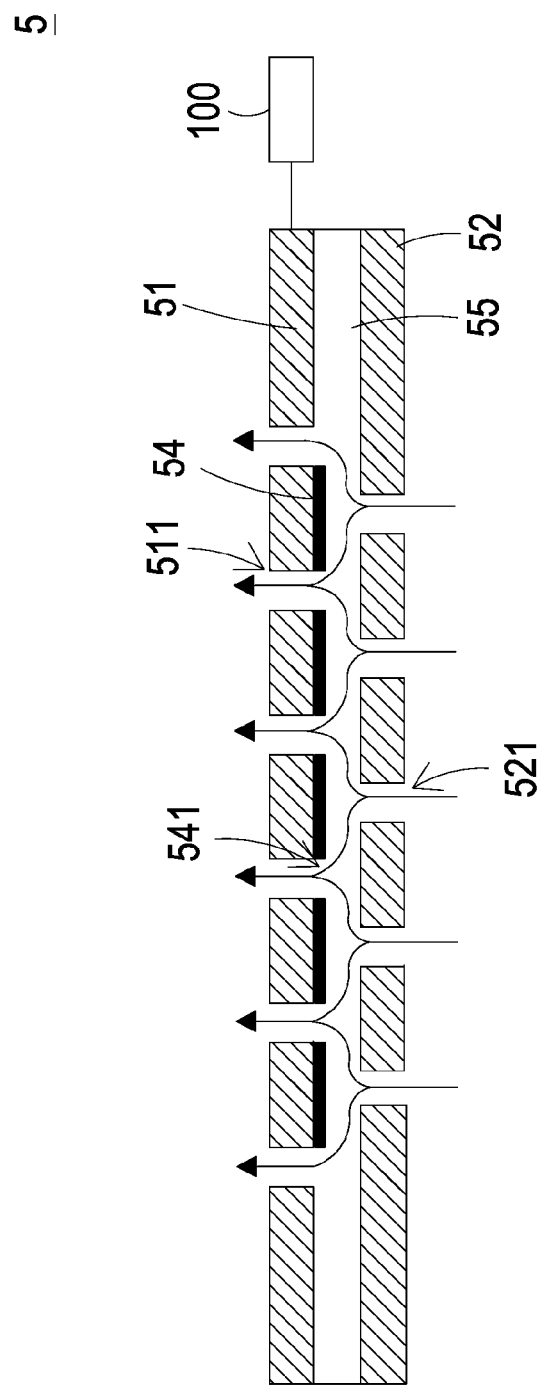
FIGS. 5A and 5B are cross-section views illustrating the actions of the valve according to the fourth and fifth aspects of the present disclosure.
Figure 5B:
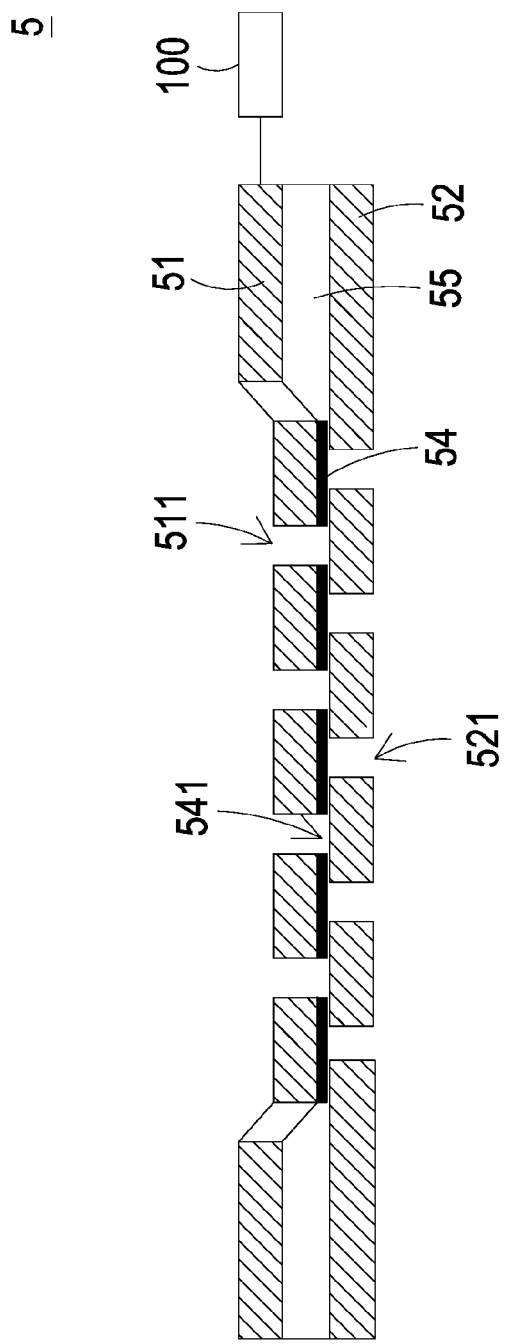

Please refer to FIGS. 5A and 5B. FIGS. 5A and 5B are cross-section views illustrating the actions of the valve according to the fourth and fifth aspects of the valve 5 of the present disclosure. In accordance with the fourth aspect of the valve 5 of the present embodiment, the valve 5 includes a holding component 51, a sealing component 52 and a flexible membrane 54. The holding component 51 has at least two orifices 511. An accommodation space 55 is maintained between the holding component 51 and the sealing component 52. The flexible membrane 54 is made of a flexible material, attached on a surface of the holding component 51 and disposed within the accommodation space 55. The flexible membrane 54 has at least two orifices 541 corresponding in position to the at least two orifices 511 of the holding component 51, respectively. More specifically, the at least two orifices 511 of the holding component 51 and the at least two orifices 541 of the flexible membrane 51 are substantially aligned with each other, respectively. The sealing component 52 has at least one orifice 521. The orifice 521 of the sealing component 52 and the at least two orifices 511 of the holding component 51 are staggered in position to be misaligned with each other.

Please refer to FIGS. 5A and 5B again. In accordance with the fourth aspect of the valve 5, the holding component 51 is made of a thermal expansion material and electrically connected to a control circuit 100. The control circuit 100 is used to control the holding component 51 to be heated. To open the valve 5, the holding component 51 is controlled to be free of thermal expansion, so that the accommodation space 55 between the holding component 51 and the sealing component 52 is maintained (as shown in FIG. 5A). Alternatively, to close the valve 5, the holding component 51 is controlled to be heated and expands to an extent such that the holding component 51 is abutting against the sealing component 52 through the flexible membrane 54. Consequently, the flexible membrane 54 is in close contact with the sealing component 52 to close the at least one orifice 521 thereof, such that the valve 5 is closed (as shown in FIG. 5B).

Please refer to FIGS. 5A and 5B again. In accordance with the fifth aspect of the valve 5, the holding component 51 is made of a piezoelectric material and controlled by a control circuit 100 to be deformed. To open the valve 5, the holding component 51 is controlled to be free of deformation so that the accommodation space 55 between the holding component 51 and the sealing component 52 is maintained (as shown in FIG. 5A). Alternatively, to close the valve 5, the holding component 51 is controlled to be deformed to an extent such that the holding component 51 is abutting against the sealing component 52 through the flexible membrane 54. Consequently, the flexible membrane 54 is in close contact with the sealing component 52 to close the at least one orifice 521 thereof, such that the valve 5 is closed (as shown in FIG. 5B). In some embodiments, the holding component 51 has plural segments each of which is corresponding in position to one of the plural orifices 521 of the sealing component 52. Said segments of the holding component 51 are individually controlled by the control circuit 100, so that the valve 5 is capable of regulating the gas flow passing through to achieve a desired gas transportation amount.

In summary, the present disclosure provides a gas transportation device including a first flow guiding unit and a second flow guiding unit. With the actions of the first flow guiding unit and the second flow guiding unit, a pressure gradient is generated to make the ambient gas flow rapidly to be converged to and accumulated in a gas-collection chamber between the first flow guiding unit and the second flow guiding unit. Then, the gas is discharged out through the discharging opening, by which the adjustment of the gas transportation amount is achieved. In addition, with the actions of driving the actuating plate by the piezoelectric component, a pressure gradient is generated in the designed flow channels and the compressible chambers, so as to facilitate high speed flow of the transported gas from the inlet side to the outlet side. Furthermore, the number, the arrangement and the driving methods of the first flow guiding unit and the second flow guiding unit can be varied flexibly according to the requirements of various gas transportation apparatuses for achieving the different gas transportation amount. Advantageously, the gas transportation device of the present disclosure provides high flow rate, high efficiency and high flexibility in transporting gas as providing the adjustable gas transportation amount.

While the disclosure has been described in terms of what is presently considered to be the most practical and preferred embodiments, it is to be understood that the disclosure needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. A gas transportation device comprising:
   a first flow guiding unit and a second flow guiding unit, each of which has an inlet and an outlet, wherein while the first flow guiding unit and the second flow guiding unit are actuated, gas is inhaled through the respective inlets thereof and subsequently discharged out through the respective outlets thereof; and
   a gas-collection chamber disposed between the first flow guiding unit and the second flow guiding unit, the gas collection chamber comprising a discharging opening,
   wherein each of the first flow guiding unit and the second flow guiding unit comprises:
      an inlet plate comprising the inlet;
      a substrate;
      a resonance plate comprising a central aperture, the resonance plate and the inlet plate defining a convergence chamber therebetween;
      an actuating plate comprising a suspension part, an outer frame part and at least one vacant space;
      a piezoelectric component attached on a surface of the suspension part of the actuating plate;
      an outlet plate comprising the outlet; and
      at least one valve disposed within at least one of the inlet and the outlet,
   wherein the inlet plate, the substrate, the resonance plate, the actuating plate, the piezoelectric component and the outlet plate are sequentially stacked, the resonance plate and the actuating plate have a gap therebetween to form a first chamber, and a second chamber is formed between the actuating plate and the outlet plate,
   wherein the at least one valve comprises a holding component, a sealing component, and a valve plate, wherein the sealing component is distanced from the holding component to form an accommodation space therebetween, and the valve plate is disposed within the accommodation space,
   wherein the holding component is electrically coupled with a control circuit, and the at least one valve is controlled to be in an opened position or in a closed position by the control circuit,
   wherein the gas is inhaled through the inlets of the first flow guiding unit and the second flow guiding unit, transported to the gas-collection chamber through the outlets of the first flow guiding unit and the second flow guiding unit, and the gas in the gas-collection chamber is discharged out through the discharging opening, so as to achieve an adjustment of gas transportation amount.

2. The gas transportation device according to claim 1, wherein while the piezoelectric component drives the actuating plate to generate a bending vibration in resonance, a pressure difference is formed between the first chamber and the second chamber, the at least one valve is opened, and the gas is inhaled into the convergence chamber via the inlet of the inlet plate, transported into the first chamber via the central aperture of the resonance plate, transported into the second chamber via the at least one vacant space, and discharged out through the outlet of the outlet plate, so as to transport the gas.

3. The gas transportation device according to claim 2, wherein the holding component has at least two orifices, the sealing component has at least one orifice, and the valve plate has at least two orifices substantially aligned with the at least two orifices of the holding component, respectively, wherein the at least two orifices of the valve plate and the at least one orifice of the sealing component are staggered in position to be misaligned with each other.

4. The gas transportation device according to claim 2, wherein the holding component, the sealing component and the valve plate are made of a graphene material.

5. The gas transportation device according to claim 4, wherein the electrical polarity of the holding component is controlled by the control circuit, wherein while the valve plate and the holding component are maintained in reversed polarity, the valve plate is moved close to the holding component such that the at least one valve is opened, and while the valve plate and the holding component are maintained in identical polarity, the valve plate is moved close to the sealing component such that the at least one valve is closed.

6. The gas transportation device according to claim 2, wherein the valve plate is a flexible membrane attached on a surface of the holding component.

7. The gas transportation device according to claim 6, wherein the holding component is made of a thermal expansion material and controlled by the control circuit to be heated, wherein while the holding component is heated and expands, the holding component brings the flexible membrane in close contact with the sealing component to close at least one orifice of the sealing component, such that the at least one valve is closed, and while the holding component is free of thermal expansion, the accommodation space between the sealing component and the holding component is maintained such that the at least one valve is opened.

8. The gas transportation device according to claim 6, wherein the holding component is made of a piezoelectric material and controlled by the control circuit to be deformed, wherein while the holding component is deformed, the flexible membrane is in close contact with the sealing component to close at least one orifice of the sealing component, such that the at least one valve is closed, and while the holding component is free of deformation, the accommodation space between the sealing component and the holding component is maintained such that the at least one valve is opened.

9. The gas transportation device according to claim 1, wherein the valve plate is made of a charged material, and the holding component is made of a bipolar conductive material, wherein the electrical polarity of the holding component is controlled by the control circuit, wherein while the valve plate and the holding component are maintained in reversed polarity, the valve plate is moved close to the holding component such that the valve is opened, and while the valve plate and the holding component are maintained in identical polarity, the valve plate is moved close to the sealing component such that the valve is closed.

10. The gas transportation device according to claim 1, wherein the valve plate is made of a magnetic material, the holding component is made of a magnetic material with switchable magnetic polarity controlled by the control circuit, wherein while the valve plate and the holding component are maintained in reversed polarity, the valve plate is moved close to the holding component such that the valve is opened, and while the valve plate and the holding component are maintained in identical polarity, the valve plate is moved close to the sealing component such that the valve is closed.

11. A gas transportation device comprising:
at least one first flow guiding unit and at least one second flow guiding unit, each of which has at least one inlet and at least one outlet, wherein while the at least one first flow guiding unit and the at least one second flow guiding unit are actuated, gas is inhaled through the respective inlets thereof and subsequently discharged out through the respective outlets thereof; and
at least one gas-collection chamber disposed between the at least one first flow guiding unit and the at least one second flow guiding unit, the at least one gas collection chamber comprising at least one discharging opening,
wherein each of the at least one first flow guiding unit and the at least one second flow guiding unit comprises:
an inlet plate comprising the inlet;
a substrate;
a resonance plate comprising a central aperture, the resonance plate and the inlet plate defining a convergence chamber therebetween;
an actuating plate comprising a suspension part, an outer frame part and at least one vacant space;
a piezoelectric component attached on a surface of the suspension part of the actuating plate;
an outlet plate comprising the outlet; and
at least one valve disposed within at least one of the inlet and the outlet,
wherein the inlet plate, the substrate, the resonance plate, the actuating plate, the piezoelectric component and the outlet plate are sequentially stacked, the resonance plate and the actuating plate have a gap therebetween to form a first chamber, and a second chamber is formed between the actuating plate and the outlet plate,
wherein the at least one valve comprises a holding component, a sealing component, and a valve plate, wherein the sealing component is distanced from the holding component to form an accommodation space therebetween, and the valve plate disposed within the accommodation space,
wherein the holding component is electrically coupled with a control circuit, and the at least one valve is controlled to be in an opened position or in a closed position by the control circuit,
wherein the gas is inhaled through the inlets of the at least one first flow guiding unit and the at least one second flow guiding unit, and transported to the at least one gas-collection chamber through the outlets of the at least one first flow guiding unit and the at least one second flow guiding unit, and the gas in the at least one gas-collection chamber is discharged out through the discharging opening, so as to achieve an adjustment of gas transportation amount.

* * * * *